April 6, 1954  Z. O. ST. PALLEY  2,674,026
HOLE SAW
Filed July 5, 1952

INVENTOR.
Zoltan O. St. Palley

Patented Apr. 6, 1954

2,674,026

UNITED STATES PATENT OFFICE 2,674,026

HOLE SAW

Zoltan O. St. Palley, Branford, Conn.

Application July 5, 1952, Serial No. 297,244

4 Claims. (Cl. 29—67)

My invention relates to improvements in hole saws, and has particular utility in hole saws having thin split annular blades, such as used for cutting BX cable armors, which are deeply recessed for mechanical support and also for limiting the depth of the cut. As a result of the deep recessing, the removal of the worn blades of these hole saws represents great difficulties, because the hardened teeth, which is usually the only part of the blade projecting out of the recess of the holder, break very easily when pinched by a plier.

One object of my invention is to provide a hole saw in which the blade can be removed easily and conveniently, thereby reducing the time and effort required for the essential and frequent operation of renewing the blades.

Another object of my invention is to provide a hole saw which requires a common screw driver, as the only tool, for the replacement of the blade.

Another object of my invention is to provide a means for the clamping of the hole saw blade, which effectively prevents the slipping of the blade in the holder and which gives ample mechanical support even to the thinnest blades.

Another object of my invention is to provide a hole saw which can use very inexpensive split annular blades, made of short pieces of flexible straight saw blades, with satisfactory result.

Other objects and advantages of the invention will be apparent during the course of the following description.

Figure 1:
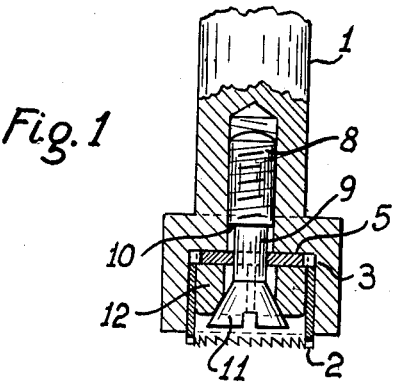
Figure 2:
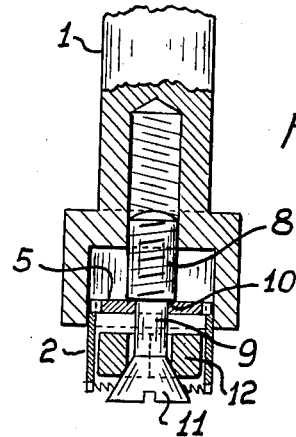
Figures 3, 4:
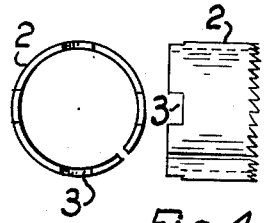
Figures 5, 6:
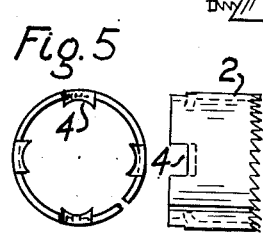
Figure 7:
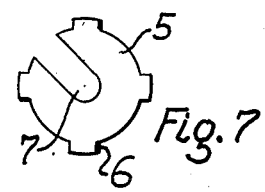
Figure 8:
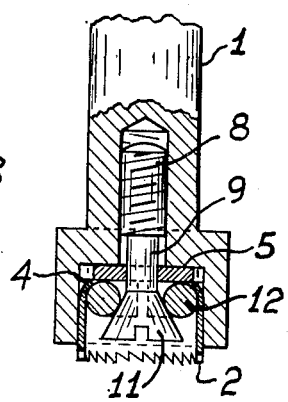
Figure 9:
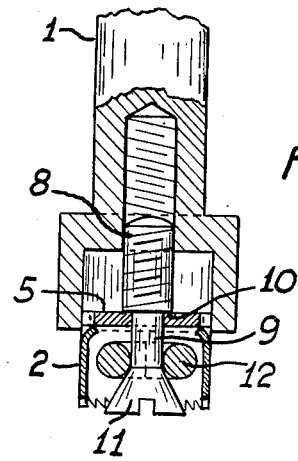
Figure 10:

In the accompanying drawing, forming a part of this application, wherein, for the purpose of illustration, are shown a preferred embodiment and also a modified form of my invention, Figure 1 is a central sectional view of the preferred form of my hole saw, with the blade clamped in position, Figure 2 is a central sectional view of the same, with the blade partly extracted, Figure 3 is a plan view of the blade used in the hole saw shown in Figures 1 and 2, Figure 4 is a side view of the same blade, Figure 5 is a plan view of a modified blade, Figure 6 is a side view of the same modified blade, Figure 7 is a plan view of the lifting plate, Figure 8 is a central sectional view of a modified form of my hole saw, with the blade shown in Figures 5 and 6, clamped in position, Figure 9 is a central sectional view of the same, with the blade partly extracted, Figure 10 is a plan view of the split clamping ring.

In the drawing, wherein like numerals are employed to designate like parts throughout the same, Fig. 1 shows the preferred form of my invention, completely assembled and ready for operation, in which, the numeral 1 designates a cylindrical holder, some times called mandrel, having a cylindrical cavity and a threaded central hole coaxially disposed. Recessed in said cavity is a cylindrical split annular hole saw blade 2, having notches 3 cut into its upper edge, the details of which are more clearly shown in Figs. 3 and 4. Adjacent to the flat end wall of said cavity is a lifting plate 5, shown also in detail in Fig. 7, which has peripheral teeth 6 fitting into and engaging the notches 3 of the blade 2, as a result of which, the rotation of the blade 2 will cause a similar and simultaneous rotation of the lifting plate 5. The diameter of the lifting plate 5 over the teeth 6 fits closely into the cavity of the holder 1, so that when said lifting plate is moved outwardly, it forces the hole saw blade 2 out of the cavity. Mounted in the threaded central hole of the holder 1 is a screw 8, which has a neck 9 of smaller diameter than the screw, forming a shoulder 10. Adjoining said neck is a conical head 11, with a slot for the application of a screw driver. The lifting plate 5 has an opening reaching from the periphery to the center (see Fig. 7) which permits the insertion and the free rotation of the neck 9, but which is narrower than the diameter of the screw 8, so that the shoulder 10 will engage said lifting plate if the screw is turned in the direction giving an outward motion. Surrounding the head 11 of the screw is a clamping ring 12, which is split and is arranged to expand radially when the screw 8 is tightened, thereby forcing the hole saw blade 2 against the side wall of the cavity of holder 1, and effecting a secure clamping of said blade. At the same time, the ring 12 will press the lifting plate 5 against the flat end wall of the cavity.

The method of removing the hole saw blade 2 is clearly illustrated in Fig. 2 of the drawing. The hole saw shown here is the same preferred embodiment as in Fig. 1 but with the difference that the screw 8 has been moved outwardly by means of a screw driver, with the result, that the clamping ring 12 has contracted, causing the unclamping of the blade 2, and the shoulder 10 of the screw has pushed the lifting plate 5 and the hole saw blade 2 outwardly from the cavity of the holder 1. In this position, the blade 2 can be easily removed from the cavity either directly by hand or by the continued rotation of the screw 8.

Figs. 5 and 6 show a modified form of the hole saw blade 2, in which the blade is bent inwardly at the notch 4, forming an extension of the contact area between the lifting plate and the hole saw.

Fig. 8 shows a modified form of my invention with the hole saw blade clamped in position. Fig. 9 shows the same with the blade partly extracted. This modified form differs from the preferred embodiment (Figs. 1 and 2) in two respects, the blade 2 is bent inwardly at the notches 4, and the split clamping ring 12 is of circular cross section.

Fig. 10 of the drawing shows a plan view of the clamping ring 12 which, in this case, is split into three sections. It will be within the spirit and scope of this invention to use clamping rings of different construction, provided that they produce a force against the hole saw blade when screw 8 is tightened.

The method of operation of my invention will be as follows:

The function of the interlocking notches 3 of the blade and teeth 6 of the lifting plate is twofold. In the clamped position this interlock will contribute very effectively to prevent the slipping of the blade. In case the clamping of the blade is not tight enough, this interlock will act as a self-tightening device, because any slipping of the blade will turn the lifting plate and these, by their combined friction, will rotate the clamping ring which, by frictional contact, will tighten the screw until the slipping of the blade stops.

When it is required to remove a worn blade from the hole saw, a screw driver is inserted into the slot of the screw head 11 and the screw 8 is loosened and turned to move outwardly. This relieves the pressure of the clamping ring 12, causing the unclamping of the blade 2. After a few turns of the screw 8 the shoulder 12 engages the lifting plate 5 and this, in turn, exerts outward pressure on the hole saw blade 2, causing said blade to move outwardly from the cavity of the holder 1.

It is to be understood that the forms of my invention, herewith shown and described, are to be taken as examples of the same, and various changes in the shape, size and arrangement of parts may be resorted to, without departing from the spirit of my invention or the scope of the subjoined claims.

I claim:

1. Hole saw holder having a cylindrical cavity; a split annular saw blade recessed in said cavity; said blade having a notch on the edge opposite the cutting edge; a lifting plate, having an opening; a tooth, secured to said lifting plate, and engaging said notch; a screw, coaxially disposed in said cavity with threaded connection with said holder and extending through said opening of said lifting plate, said screw having a head and a shoulder, said shoulder being adapted to engage and to move said lifting plate outwardly from said cavity when said screw is being unscrewed from said holder; a clamping ring adapted to press said plate against the wall of said cavity when said ring is pressed by the head of said screw.

2. A hole saw holder having a cylindrical cavity; a lifting plate disposed in said cavity, and having a central opening and peripheral teeth; a split annular saw blade, cylindrical in shape, recessed in said cavity, and being provided, opposite the cutting edge, with notches corresponding to, and engaging said teeth; an expansible clamping ring adapted to press simultaneously said blade against the side wall of said cavity and said lifting plate against the end wall of said cavity; a central screw, coaxial with said cavity, and passing through the central opening of said lifting plate, and having a shoulder to engage and move outwardly said lifting plate when said screw is turned in one direction; and a conical head to engage and expand said ring when said screw is turned in the opposite direction.

3. A hole saw holder having a cylindrical cavity; a lifting plate; teeth attached to said cavity; a lifting plate; a split annular saw blade having notches engaging said teeth; an expansible clamping ring, adapted to press simultaneously said lifting plate and said saw blade; a central screw with shoulder adapted to engage and move outwardly said lifting plate when screwed outwardly; a conical head, carried by said screw, adapted to engage and expand said ring when said screw is screwed inwardly with respect to said holder.

4. In a hole saw having a holder with a cylindrical cavity, the combination comprising a lifting plate, disposed parallel to the end wall of said cavity; teeth attached to said lifting plate; a split annular saw blade, having notches engaging said teeth; and an expansible clamping ring adapted to exert pressure simultaneously on said lifting plate and on said saw blade.

References Cited in the file of this patent

UNITED STATES PATENTS

| Number | Name | Date |
|---|---|---|
| Re. 19,386 | Hand et al. | Nov. 27, 1934 |
| 332,715 | Hoyt | Dec. 22, 1885 |
| 1,467,406 | Walker | Sept. 11, 1923 |
| 2,482,439 | Smith | Sept. 20, 1949 |
| 2,484,150 | Brown | Oct. 11, 1949 |

FOREIGN PATENTS

| Number | Country | Date |
|---|---|---|
| 566,612 | Great Britain | Jan. 5, 1945 |